United States Patent [19]
Kardach et al.

[11] Patent Number: 5,671,421
[45] Date of Patent: Sep. 23, 1997

[54] SERIAL INTERRUPT BUS PROTOCOL

[75] Inventors: James Kardach, San Jose; Sung Soo Cho, Sunnyvale; Nicholas B. Peterson; Thomas R. Lane, both of San Jose; Jayesh M. Joshi, Santa Clara; Neil Songer, San Jose, all of Calif.

[73] Assignee: Intel Corporation, Santa Clara, Calif.

[21] Appl. No.: 351,637

[22] Filed: Dec. 7, 1994

[51] Int. Cl.⁶ .................. G06F 9/46; G06F 13/14
[52] U.S. Cl. ................ 395/733; 395/734; 395/739; 395/741; 395/281; 395/283; 395/800; 395/868
[58] Field of Search ...................... 395/733, 737, 395/739, 742, 750, 735, 800, 891, 868, 869, 741, 291, 293, 500, 550

[56] References Cited

U.S. PATENT DOCUMENTS

| | | | |
|---|---|---|---|
| 4,275,458 | 6/1981 | Khera | 395/735 |
| 4,799,148 | 1/1989 | Nishioka | 395/740 |
| 5,119,496 | 6/1992 | Nishikaw et al. | 395/742 |
| 5,274,795 | 12/1993 | Vachon | 395/500 |
| 5,305,441 | 4/1994 | Okochi et al. | 395/293 |
| 5,317,748 | 5/1994 | Shimuzu | 395/725 |
| 5,396,633 | 3/1995 | Mayer et al. | 395/725 |
| 5,410,708 | 4/1995 | Miyamori | 395/734 |
| 5,410,710 | 4/1995 | Sarangdhar et al. | 395/739 |
| 5,414,860 | 5/1995 | Canova, Jr. et al. | 395/750 |
| 5,432,943 | 7/1995 | Mitsuishi | 395/734 |
| 5,475,854 | 12/1995 | Thomsen et al. | 395/800 |

*Primary Examiner*—Jack B. Harvey
*Assistant Examiner*—Raymond N. Phan
*Attorney, Agent, or Firm*—Blakely, Sokoloff, Taylor & Zafman

[57] ABSTRACT

A serial interrupt bus protocol is implemented in which any number of peripherals in a computer system may signal any predetermined interrupt signals to the system's interrupt controller without requiring a dedicated pin for each possible interrupt. Each peripheral implemented on the serial interrupt bus incorporates state machine logic for cycling through possible interrupt states. The peripherals are daisy chained beginning and ending with a serial interrupt controller which follows the same state machine logic as the system peripherals. When the serial interrupt controller receives an active interrupt signal, it determines which interrupt signal to provide to the system's interrupt controller based on the interrupt state of the interrupt controller state machine logic. Peripherals on a secondary serial interrupt bus may be daisy chained with peripherals on a primary system interrupt bus through a system interrupt bridge which also includes state machine logic for following the same state diagram as the system peripherals.

19 Claims, 5 Drawing Sheets

SERIAL INTERRUPT BUS PROTOCOL

BACKGROUND OF THE INVENTION

1. Field of the Invention

The present invention relates to computer system peripheral connections. More particularly, the present invention relates to handling multiple possible interrupts in computer systems utilizing a serial peripheral interrupt bus.

2. Art Background

In the computer industry, one widely accepted system architecture for personal computers has been the AT system design. Prior systems incorporating this architecture included system buses implementing the ISA, and then later, the EISA bus protocols. This protocol defines fifteen distinct system interrupts for use by various components within the system. These interrupts are designated IRQ0 through IRQ15 with one of the IRQ signals such as IRQ2 being dedicated for use within the system's programmable interrupt controller (PIC) mechanism.

The above described computer systems that implement the ISA or EISA bus protocol interrupt mechanism generally incorporate an interrupt controller that receives the various IRQ signals and, in response thereto, provides a signal to the system's central processing unit (CPU) indicating the existence of a pending interrupt. The CPU, in response to an active interrupt signal, acknowledges the interrupt signal to the interrupt controller whereupon the interrupt controller provides a code vector to the CPU for executing the appropriate interrupt service routine (ISR). One such interrupt controller, now well known, is the Intel 8259 programmable interrupt controller (PIC). In one embodiment, that interrupt controller is capable of receiving eight distinct IRQ signals. To support the full range of IRQ signals [0:15], a first PIC receives IRQs 8–15 and generates an interrupt signal output as response thereto. The output of the first PIC is then provided as the IRQ2 input to a second PIC with the other seven inputs coming from other components. The second PIC supplies its output to the CPU. In this manner, two eight-IRQ input PICs are chained together to provide for fifteen possible IRQ signals within the system.

The above interrupt signaling protocol suffers some unfortunate disadvantages. While some computer system components are designated to provide a specific IRQ output to the system PIC, other components are left free to be configured for multiple possible IRQ signals. Under conventional peripheral design methods, this would require a separate pin for each interrupt that the device might use, conceivably up to fifteen pins to direct 15 possible ISA IRQ interrupt signals. Each of these pins would drive a separate signal line to the system PIC for signaling the CPU when an interrupt needed to be serviced. In addition to driving up the cost of implementing peripherals, this increases the complexity and the size of the peripheral's interconnections. This has become a greater concern recently with the reduction in size of computer systems, particularly portable and notebook class systems. It is therefore an object of the present invention to reduce the pin requirements and complexity of implementing peripherals that may be configured for multiple interrupts.

SUMMARY OF THE INVENTION

From the foregoing, it can be appreciated that a computer system's architecture may be enhanced in a manner that reduces the cost of implementing peripherals, as well as reducing peripheral pin requirements while still complying with a multiple-pin interrupt protocol. Accordingly, it is an object of the present invention to provide a method and apparatus for implementing a serial bus protocol which allows system peripherals or components to be configured for generating any predetermined interrupt signal without requiring a dedicated pin for each possible interrupt signal. Particularly, it is an object of the present invention to provide a protocol for peripherals implemented on a serial interrupt bus to generate any IRQ signal through the use of two pins which propagate signals in accordance with the protocol of the present invention.

In one embodiment of the present invention, a computer system is implemented having both a primary and secondary serial interrupt bus. The serial interrupt bus provides a clocking signal to peripherals attached to the buses as well as the propagated interrupt signals through a chain of peripherals implemented on the bus. Primary and secondary serial interrupt buses are illustrated in the one embodiment to highlight the suitability of the present invention for use in notebook computers that may at some times be docked in a docking station. The primary serial interrupt bus is used in this embodiment for peripherals associated with the portable computer, while peripherals associated with the secondary serial interrupt bus are associated with the docking station. This also serves to illustrate the functionality of a serial interrupt bridge component for including peripherals of the secondary interrupt bus in the serial interrupt peripheral chain to be described below.

The computer architecture of the described embodiment includes a programmable interrupt controller (PIC) mechanism for signaling the system processing unit when a pending interrupt needs to be serviced. The programmable interrupt controller mechanism receives as inputs the fifteen possible IRQ signals in accordance with the ISA or EISA bus interrupt protocols. The PIC mechanism receives these IRQ signals from a serial interrupt controller (SIC) which drives the serial interrupt bus.

In accordance with the embodiment of the present invention, each peripheral in the computer system need only dedicate two pins for interrupt signaling. Each has a serial output pin ($S_{out}$) and serial input pin ($S_{in}$). The serial interrupt controller also has an $S_{out}$ pin coupled to the $S_{in}$ pin of the first peripheral residing in the serial bus (or to a serial interrupt bridge (SIB) if one is implemented for potential docking purposes). The $S_{out}$ pin of the first peripheral (or the SIB) is coupled to the $S_{in}$ pin of the next peripheral in a serial peripheral chain. Its $S_{out}$ pin is then coupled to the next $S_{in}$ pin continuing down the line of peripherals implemented on the serial bus. The last peripheral in the chain has its $S_{out}$ pin coupled to the $S_{in}$ pin of the serial interrupt controller.

In one embodiment of a computer system which implements a bridge, the SIB utilizes four pins. It has a first $S_{in}$ pin which receives the output of the $S_{out}$ pin from the SIC. The SIB also has two $S_{out}$ pins. The first $S_{out}$ pin of the bridge drives its signal to the $S_{in}$ pin of the first peripheral implemented on the secondary serial interrupt bus. The peripherals of the secondary bus are chained through their $S_{out}$ and $S_{in}$ pins in the same manner as the peripherals of the primary serial interrupt bus as described above. The $S_{out}$ pin of the last peripheral and the secondary bus drives the second $S_{in}$ input to the SIB. The SIB then drives its second $S_{out}$ signal to the $S_{in}$ pin of the first peripheral of the primary bus, thus effectively adding all the secondary bus peripherals to the daisy chain of the primary bus peripherals in the system.

In the one embodiment of the present invention in which the secondary bus represents a docking station peripheral bus, the secondary bus becomes active only when the system is docked, otherwise only the primary bus is used. In the latter case, the bridge forwards serial interrupt signals to the first peripheral of the primary bus.

Each peripheral implemented for use on the serial interrupt bus incorporates serial interrupt peripheral (SIP) logic. Each SIP logic and the SIC are clocked to the same clock. Each has logic for following a state diagram which cycles for one clock cycle through each of the possible IRQ interrupt states. Each peripheral in the serial chain remains one state ahead of the peripheral behind it. When a peripheral needs to send a particular IRQ signal to the system PIC, it will send an active signal out through its $S_{in}$ pin only when it is in the corresponding IRQ state of the SIP logic state machine. Each peripheral in the chain will forward any signals received on $S_{in}$ through its output $S_{out}$. The SIC, which in one embodiment resides in the system I/O controller, includes state machine logic for running the same state machine as the SIP logic. Accordingly, when an active signal is forwarded to the SIC from the last peripheral in the serial chain, the SIC is made aware of which IRQ signal needs to be provided to the system PIC. This provides a mechanism for any number of peripherals in a computer system to generate any possible system IRQ interrupt signal without requiring a dedicated pin for each one. It further allows for the sharing of IRQs because multiple peripherals can send an active signal in the same IRQ state with the assurance that the SIC will forward the proper IRQ signal to the system PIC.

In one embodiment of the present invention, provision is also made for the SIC to directly provide a system management interrupt (SMI) to the system CPU, bypassing the system's PIC. The SIP logic of each peripheral and the SIC logic each include a state for generating the system management interrupt (SMI).

BRIEF DESCRIPTION OF THE DRAWINGS

The objects, features and advantages of the present invention will be made apparent from the following detailed description in which.

DETAILED DESCRIPTION OF THE INVENTION

A method and apparatus are provided for an interrupt signaling protocol in a computer system that implements a serial interrupt bus. In this detailed description, one embodiment of a computer system is described which includes both a primary and a secondary serial interrupt bus, consistent with a dockable portable computer and peripheral components associated with both the portable computer and a docking station. It should be understood that this is for the purpose of illustration and is not provided as a limitation in that the present invention may be practiced with other computer systems where it is desirable to implement a serial interrupt bus to achieve the advantages of the present invention.

Throughout this detailed description, numerous specific details are set forth such as particular signal names, bus protocols and computer architecture types, in order to provide a thorough understanding of the present invention. It will be appreciated by one having ordinary skill in the art that the present invention may be practiced without such specific details. In other instances, well known components, structures and techniques have not been described in detail in order to avoid obscuring the subject matter of the present invention. Particularly, much of the functionality of the present invention is going to be described in terms of state diagram logic and timing diagrams to be implemented by various types of logic circuitry. It will be understood by those having ordinary skill in the art that the functionality of the present invention may be implemented by various techniques including, but not limited to, the use of applications specific integrated circuits (ASICs), programmable logic devices such as PALs and PLDs, or dedicated logic circuitry. In addition, signal names identified in this detailed description are in some cases described to be active in one state and inactive in another state. The teachings of the present invention are of course applicable for the inverted case as well.

Figure 1:
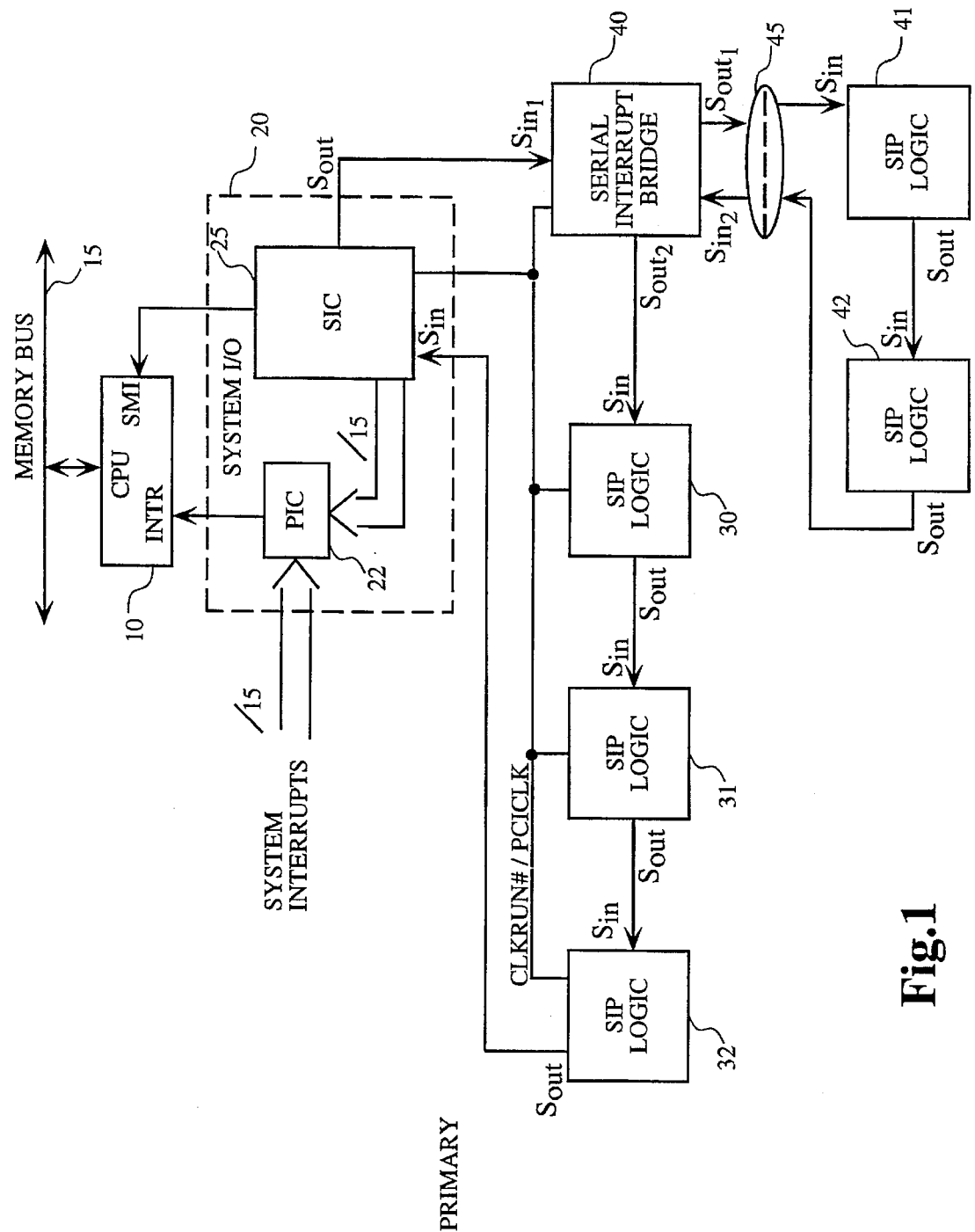
FIG. 1 illustrates a block diagram of a computer system architecture implementing the serial interrupt bus protocol in accordance with one embodiment of the present invention.

Referring now to FIG. 1, a computer system architecture which may incorporate the present invention is illustrated. The computer system architecture of FIG. 1 is illustrated so as to highlight the hierarchical interrupt organization of the architecture. Numerous components of the computer system not affected or involved within the present invention are not shown. It can be seen that the computer system includes a central processing unit (CPU) 10 that is coupled to memory bus 15 for communication with the computer system's memory system (not shown). The illustrated CPU 10 is also shown receiving two control signals from the system I/O controller 20. These are identified as the INTR interrupt signal to the CPU and the system management interrupt (SMI). As will be described more fully below, the INTR signal to the CPU is the conventional signal from the system's programmable interrupt controller mechanism (PIC) 22 which informs the CPU 10 when a system component requires the CPU to execute an interrupt service routine (ISR).

In one embodiment of the present invention, the CPU 10 is a microprocessor designed in accordance with the Intel Microprocessor Architecture. This architecture supports a mode of operation referred to as system management mode (SMM). For the support of system management mode, the CPU in certain circumstances must receive a special interrupt from the various peripherals of the system referred to as a system management interrupt (SMI). Accordingly, the CPU 10 of the illustrated computer architecture is shown receiving the SMI interrupt for system management interrupt processing as well as the conventional INTR interrupt signal.

The system I/O controller 20 includes the programmable interrupt controller (PIC) mechanism 22 for the computer system. As described above, this may be two Intel 8259 PICs configured in such a manner as to receive the fifteen possible IRQ signals from the varying system components and in response thereto, provide the INTR signal to the CPU 10. In alternative embodiments, other PIC mechanisms may be implemented which perform the same functionality. The system I/O controller 20 also includes the serial interrupt controller (SIC) 25 of the present invention. As will be described more fully below, the SIC 25 implements the serial interrupt protocol of the present invention for detecting particular IRQ requirements from the system peripherals and providing the appropriate IRQ input signal to the system PIC 22. The SIC 25 further provides the SMI interrupt signal to the CPU 10 when one of the system peripherals implementing the present invention protocol indicates the need for a system management interrupt. The PIC 22 is also coupled to receive IRQ signals from other system components such as those implemented on the computer system's motherboard or through another mechanism independent of the serial interrupt bus.

In accordance with the illustrated embodiment of the present invention, the serial interrupt bus is shown as a primary serial interrupt bus for coupling peripherals 30, 31, and 32 of the computer system. There is also a secondary serial interrupt bus for coupling peripherals 41 and 42. It is envisioned that the present invention is suitable for use in portable computing systems which may be "docked" through a docking station, illustrated as dock 45. The serial interrupt protocol of the present invention serves for handling interrupt signals generated by both the peripherals on board the portable computing system such as peripherals 30, 31, and 32 as well as peripherals associated with the docking station such as peripherals 41 and 42. With respect to the primary and secondary serial interrupt buses illustrated in FIG. 1, it can be seen that they are combined through a serial interrupt bridge 40, about which more will be described below.

Each of the peripherals associated with the serial interrupt bus protocol as well as the serial interrupt controller and the serial interrupt bridge receive clocking signals, PCICLK, and CLKRUN#. The actual timing of signal propagation in accordance with one embodiment of the present invention will be described more fully below with respect to timing diagrams of FIGS. 3 and FIG. 4.

System peripherals implementing the serial interrupt bus protocol of the present invention need only dedicate two pins for its operation. These are designated $S_{out}$ and $S_{in}$. This is also true for the serial interrupt controller 25. The peripherals of the present invention are chained together such that the $S_{out}$ signal from the SIC 25 is provided as the $S_{in}$ signal to the first peripheral (or bridge) of the serial interrupt chain. The last peripheral in the chain 32 receives its $S_{in}$ signal from the $S_{out}$ pin of the second to last peripheral 31 in the chain. The last peripheral in the chain drives its $S_{out}$ pin to the $S_{in}$ pin of the SIC 25.

When a serial interrupt bridge (SIB) 40 is implemented, it includes two $S_{in}$ pins and two $S_{out}$ pins. Its $S_{in1}$ pin receives a signal from the $S_{out}$ from the SIC 25. When the computer system is docked through docking station 45, the serial interrupt bridge provides an $S_{out1}$ signal to the $S_{in}$ input of the first peripheral 41 of the secondary serial interrupt bus. The peripherals on the secondary interrupt bus are chained together in the same manner as the peripherals on the primary serial interrupt bus. The last peripheral 42 of the secondary serial interrupt bus drives its $S_{out}$ signal to the $S_{in2}$ pin of the SIB 40. The SIB 40 then has a $S_{out2}$ pin coupled to drive a signal to the $S_{in}$ input of the first peripheral 30 on the primary serial interrupt bus. When a bridge is present in the system, but the system is not docked, the SIB 40 forwards signals received on its $S_{in1}$ pin through its $S_{out2}$ pin ignoring the pins that would be coupled to the secondary serial interrupt bus when docked.

In FIG. 1, the various peripherals 30, 31, 32, 41 and 42 are not identified with respect to the type of peripheral they are. Any peripheral component may incorporate the present invention for implementation on the serial interrupt bus. Only the serial interrupt peripheral (SIP) logic incorporated within each peripheral is illustrated in the figure. It is to be understood that each of the peripherals in the system may designate a different IRQ signal when requiring the servicing of an interrupt. Further, it is understood that some peripherals may be configured to request different IRQ inputs to be provided to the system PIC 22. Each peripheral's SIP logic, the SIB 40, and the SIC 25 will incorporate state machine logic for following the state diagram illustrated in FIG. 2. In accordance with the protocol of the present invention, each peripheral's SIP logic forwards through its $S_{out}$ pin the signal value received on its $S_{in}$ pin the previous clock cycle. In accordance with one embodiment of the present invention, it will be assumed that the $S_{in}$ signal is active in the low logic state. Of course, this may be inverted in an alternative embodiment.

When no peripherals on the serial interrupt bus require an interrupt to be serviced, each $S_{out}$ pin is pulled to a high state. The state machine logic for any given peripheral is initially in the stop state 220. When the SIP logic of a peripheral such as peripheral 32 sees an active value on its input pin $S_{in}$ ($S_{in}$ gets pulled low) the SIP logic transitions to the start message state 200. The peripheral then forwards an active signal through its $S_{out}$ pin to the $S_{in}$ pin of the next peripheral in the chain. In the case of peripheral 32, it propagates an active $S_{in}$ signal to the SIC 25. This causes the SIC 25 to transition to the start message state 200 in its state machine logic. At that time, the peripheral behind it in the serial chain has progressed one state in its state machine to the SMI state 201.

If peripheral 32, the last peripheral in the serial interrupt chain, receives an active value on its input pin $S_{in}$ when it is in the SMI state 201, it forwards that active signal on the rising edge of the next clock cycle to the $S_{in}$ pin of SIC 25. If the SIC 25 receives an active signal on its $S_{in}$ pin when its state machine logic is in the SMI state 201, it propagates an interrupt signal to the system management interrupt (SMI) input of the CPU 10. This allows the CPU 10 to immediately process system management interrupts.

Figure 2:
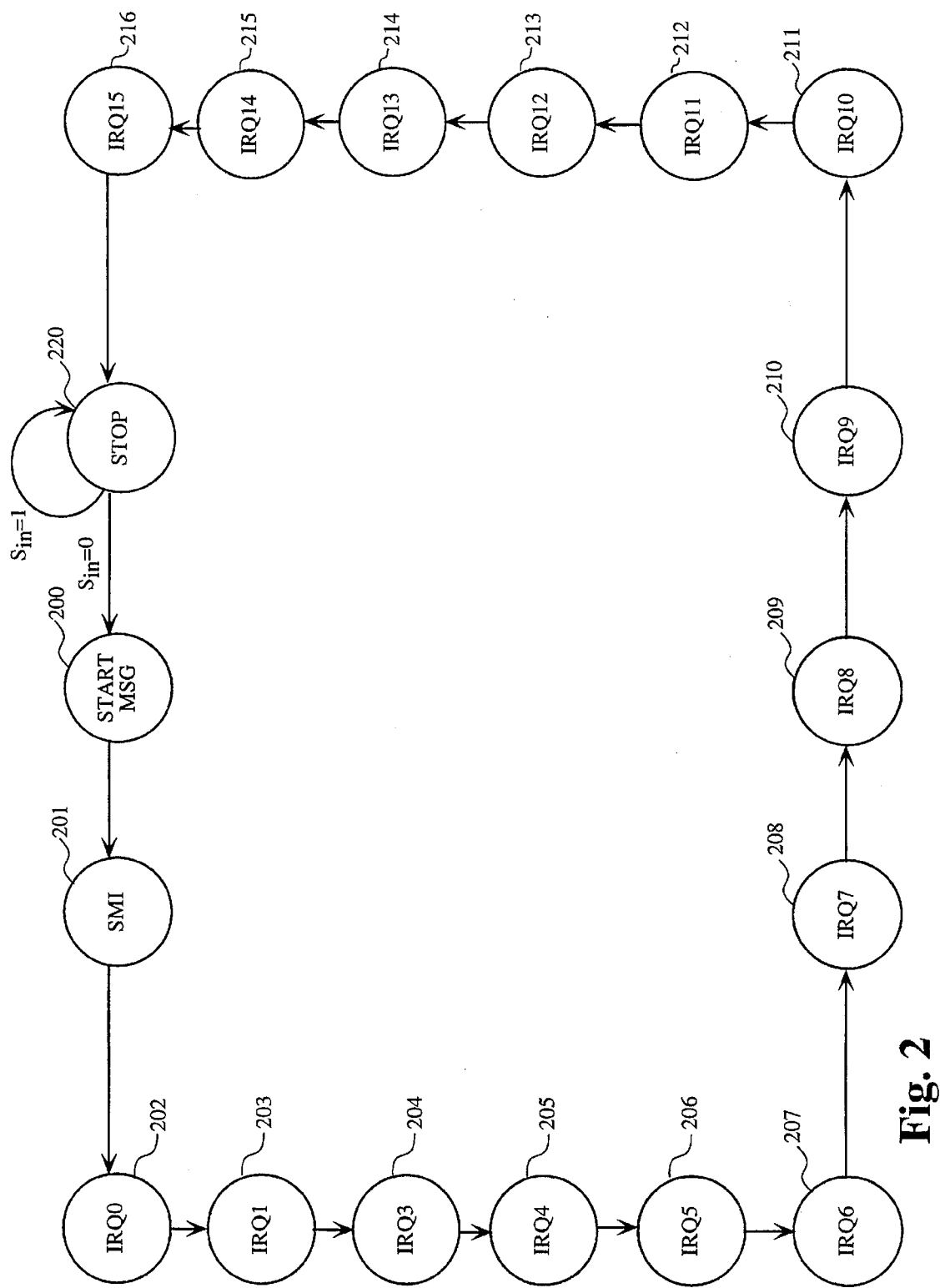
FIG. 2 illustrates a state diagram to be implemented by the serial interrupt logic associated with each peripheral implemented on the serial interrupt bus in accordance with the present invention.

As was noted above, each peripheral in the chain of peripherals on the serial interrupt bus includes state machine logic which follows the state diagram illustrated in FIG. 2. The state machines for each peripheral remain in each state of the state diagram for one clock cycle when not in the stop state 220. The transition from the stop state 220 to the start message state 200 occurs upon the first reception of an active value on the peripheral's $S_{in}$ pin. Each peripheral continues to forward through its $S_{out}$ pin the signal that was received on its $S_{in}$ pin in the previous clock cycle except when the peripheral is in the state it wants to drive an active interrupt for. Accordingly, it can be seen that the SIP logic of each peripheral is one state ahead of the peripheral immediately preceding it in the serial interrupt chain.

When a peripheral wishes to signal a particular IRQ signal, it will only do so by providing an active signal through its $S_{out}$ pin when it is in the corresponding IRQ state of the state diagram of FIG. 2. All other outputs by the peripheral on its $S_{out}$ pin will be the value received on its $S_{in}$ pin. For example, if peripheral 30, as illustrated in FIG. 1, needs to signal an IRQ12 to be serviced by the CPU 10, when its state machine logic is in the IRQ12 state 213, it will propagate an active signal through its $S_{out}$ pin. At that time, peripheral 31 will be in the IRQ11 state 212 while peripheral 32 will be in the IRQ10 state 211. Similarly, at that time the SIC 25 will be in the IRQ9 state 210. One clock cycle after the SIP logic 30 propagates an active signal through its $S_{out}$ pin, the SIP logic 31 will then be in the IRQ12 state 213 and receive an active signal through its $S_{in}$ pin. Again, the peripheral 32 will still be one state behind the peripheral 31 and will be in the IRQ11 state 212 while the SIC 25 is in the IRQ10 state 211. This signal will continue to propagate in this manner, such that when it received by the SIC 25, the SIC 25 will be in the IRQ12 state 213. Accordingly, the SIC 25 will be capable of detecting which IRQ signal, IRQ12, should be provided to the system PIC 22 based on an active signal that was output through the $S_{out}$ pin of the SIP logic 30 three clock cycles earlier. In this manner, only two pins are required for each peripheral on the serial interrupt bus for propagating potentially any number of possible IRQ interrupts in the computer system.

The above interrupt signaling principle works as well for a portable computer system that is docked through a docking unit 45. In this situation, the serial interrupt bridge (SIB) 40 comes into play. The SIB 40 includes state machine logic which also follows the same state machine illustrated by the state diagram of FIG. 2. When the SIB 40 receives its first active signal through $S_{in}$, it transitions from the stop state 220 to the start message state 200. Then, assuming the bridge is actively docked to a secondary serial interrupt bus, it will propagate on the next clock cycle an active signal through its $S_{out1}$ pin to the first peripheral on the secondary serial interrupt bus chain, in this case the one having SIP logic 41. The SIB 40 will then transition to the SMI state 201. When the SIB 40 is in the SMI state 201, the first peripheral has transitioned to the start message state 200.

From the start message state 200 the peripheral 41 propagates the start message active signal to the SIP logic 42 of the next peripheral on the secondary serial interrupt bus. As was described above, the last peripheral in the secondary serial interrupt bus forwards its $S_{out}$ output through the second $S_{in2}$ input of the SIB 40 which is then forwarded through the $S_{out2}$ output pin of the SIB 40 to the first $S_{in}$ input pin of the first peripheral 30 on the primary serial interrupt bus. In this manner, the serial interrupt bus protocol of the present invention is scalable to multiple levels of chained serial interrupt buses where each may have multiple serial interrupt peripherals coupled through a series of serial interrupt bridges.

The serial interrupt peripherals will form one logical chain such that forwarded interrupts in the appropriate state would be detected by the SIC 25 in the corresponding state for notification of the system PIC 22. This is so regardless of the number of peripherals and bridges incorporated in the system. It can further be seen that the protocol of the present invention allows multiple peripherals to be configured to generate the same IRQ signal. Thus, if a peripheral wishes to signal an active IRQ13, and another peripheral earlier in the chain has already done so, effectively the same action is taken by the second peripheral: it forwards an active signal through its $S_{out}$ pin when it is in the IRQ13 state 214.

Figure 3:
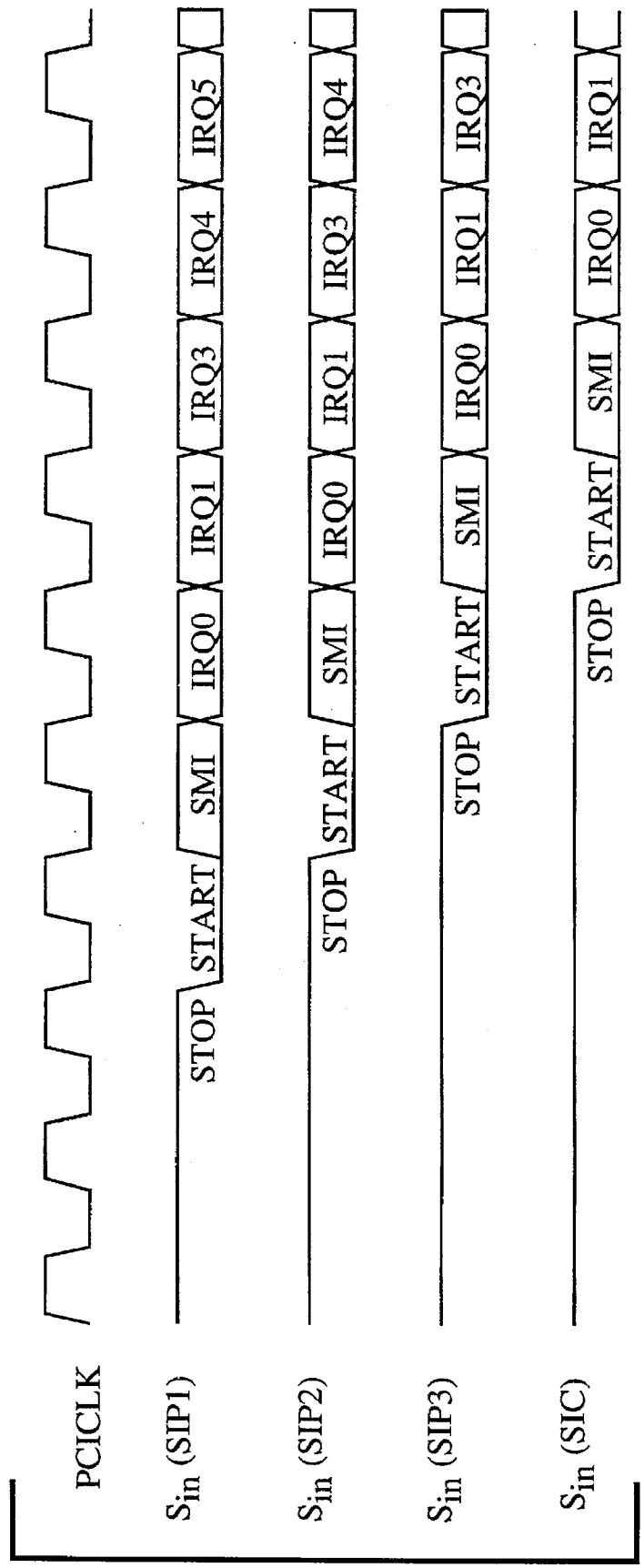
FIG. 3 illustrates a timing diagram showing the interrupt pin signaling states through a serial interrupt chain.

FIG. 3 illustrates a timing diagram that demonstrates the above described protocol in a system without a serial interrupt bridge. A first peripheral transitions from the stop state to the start message state at a first time interval which then cascades through the remaining peripherals in the chain until reaching the serial interrupt controller 25 a corresponding number of clock cycles later. Another advantage of the present invention is that it allows edge-to-level conversion of interrupt signals by a peripheral's SIP logic without the SIC needing knowledge of whether the interrupt generated by the peripheral is an edge triggered or level sensitive interrupt.

A particular embodiment of the present invention is one in which peripherals are automatically designed to run clocked to the PCICLK signal and which are already responsive to restarting the PCICLK if it is stopped when an active CLKRUN# signal is sent. Thus, only two additional pins are required to support the serial interrupt bus protocol of the present invention. It is noted that the state diagram and the SIP logic of the illustrated embodiment omit the IRQ2 state between the IRQ1 and IRQ3 states. This is because in conventional IRQ implementations, IRQ2 is dedicated to the purpose of being the cascaded channel for coupling two 8-input interrupt controllers together as described in a preceding section. This, of course, may be altered and the IRQ2 state included in alternate embodiments of the present invention.

Each state within the state diagram represents one clock sequence, and is synchronous to the PCICLK signal. Thus, the entire state machine is synchronous. However, one state, the stop state 220, relies on an asynchronous event, the first transition of the $S_{in}$ to the active state. This allows for synchronization of all peripherals to the same clock cycle. The stop state has two primary functions: 1) to synchronize the serial interrupt bus protocol sequence through the generation of a start bit (the start message active signal); and 2) to allow any serial interrupt agent to synchronously generate a stop break event (CLKRUN#) to restart the PCICLK (if stopped) upon determination of an active interrupt.

After every pass through the protocol state machine, every device ends in the stop state and waits for the next active indication on its $S_{in}$ input before transitioning to the start message state. Note that since the bus is serial, each peripheral's SIP logic will receive the start sequence one cycle after the previous SIP logic has received the sequence. Thus, the start transition does not happen at the same instant in time for all devices, but rather in a ripple fashion down the peripheral chain.

Figure 4:
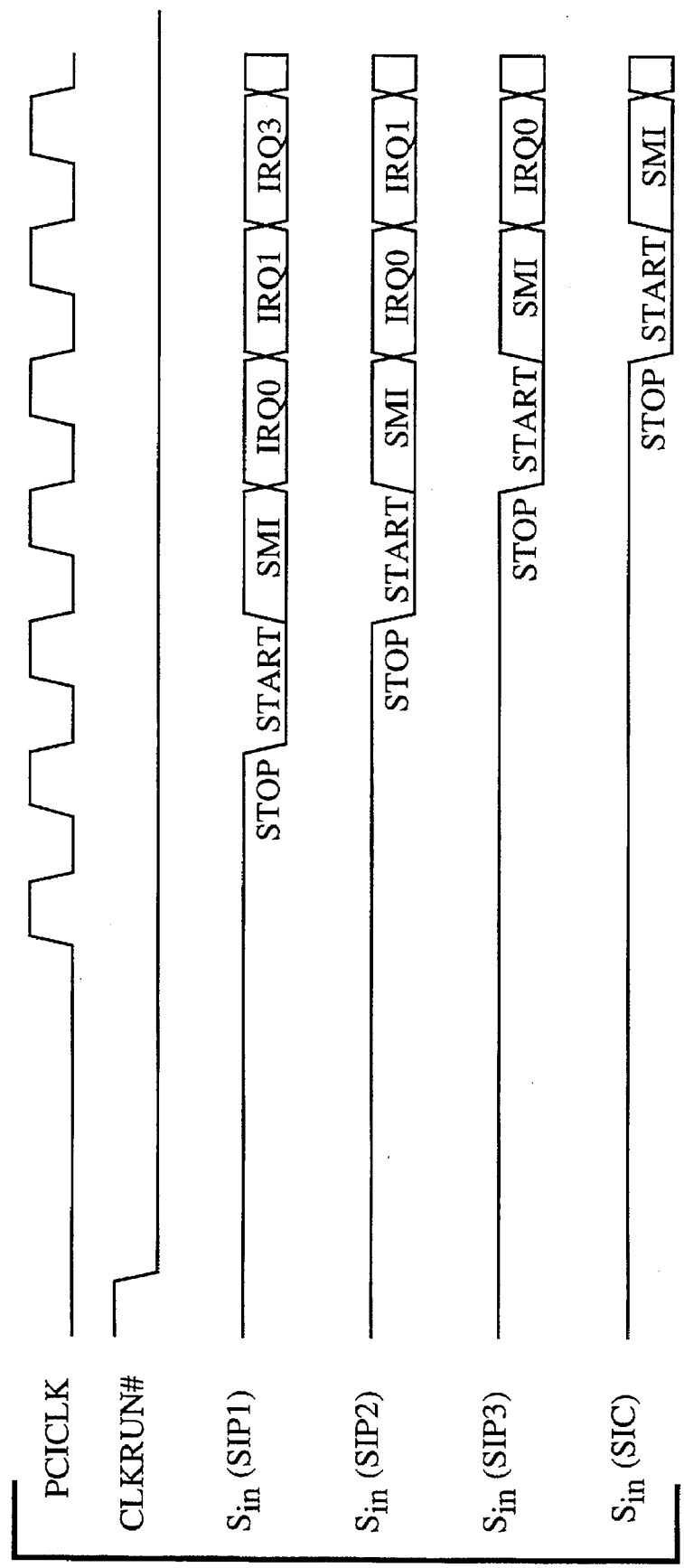
FIG. 4 illustrates a timing diagram for a peripheral or bridge to start the bus clock for the sending of interrupts.

FIG. 4 illustrates how a serial interrupt request is initiated when the PCICLK is stopped. In this case, a peripheral initiates the cycle by driving the CLKRUN# signal active when it samples that the PCICLK signal has been stopped. It holds the CLKRUN# signal low until it sees two PCICLKs in accordance with the conventional CLKRUN# specification. According to that specification, the CLKRUN# signal would then be held low by the clock control logic until the clock has stopped. Once the $S_{in}$ data pin is sampled as active, then the start state is entered. Note that it is the responsibility of the SIC 25 to see that the PCICLK is not stopped unless all serial interrupt peripherals are in the stop state 220. They can accomplish this by only letting CLKRUN# stay high for four clocks when it can guarantee all devices will be in the stop state. When the SIC is in the stop state and has not started a new message, it is guaranteed that all devices are in the stop state.

One additional refinement to the present invention can eliminate the possibility that a level interrupt request might generate a false interrupt request. This can be caused by an interrupt service routine clearing an interrupt request in an I/O device and then issuing an end of interrupt (EOI) to the system PIC. However, because of the serialization of the IRQs through the serial bus chain, if the EOI happens before the IRQs are updated, a false interrupt is generated. This is caused because the PIC generates an interrupt to the processor based on a level sensitive IRQ still being active when the EOI occurred, but is later de-asserted because the serial message eventually arrives de-asserting the IRQ. In this case, the PIC will return an interrupt vector to the processor indicating a false interrupt. While this is non-fatal, it can affect performance if it happens as many as 4,000 times per second.

To avoid this problem the SIC 25 should intercept the EOI cycle (specific or non-specific) to delay the resetting of the interrupt signal in the interrupt service routine, until the SIC has gotten an update from the SIPs that that particular IRQ should no longer be signaled. This requires one full pass through the serial chain with no active signal being received by the SIC when it next reaches that particular IRQ state. When an EOI cycle is generated, the SIC should terminate the cycle, and track bus protocol state machine. This prevents the PIC from signaling an IRQ when the requesting peripheral has in fact already de-asserted it.

Figure 5:
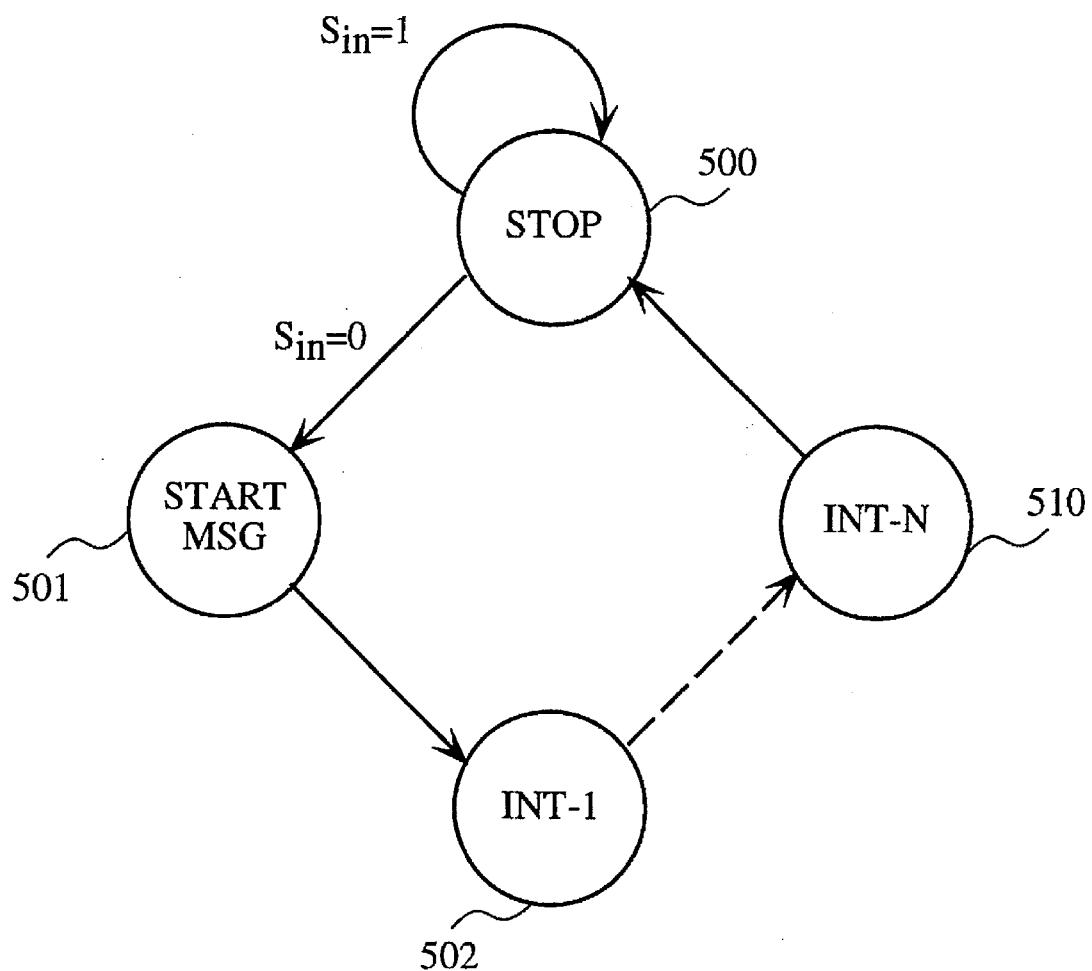
FIG. 5 illustrates a generalized state diagram for serial interrupt peripherals in accordance with the present invention.

FIG. 5 illustrates a generalized state diagram that may be generally applied for implementing the present invention. It is a generalization of the state machine diagram of FIG. 2. The initial state for the state machine logic is the stop state 500 where the state machine logic remains as long as the $S_{in}$ to the associated SIP logic is not asserted. Once the SIP logic receives an active $S_{in}$ signal, the SIP logic state machine transitions to the start message state 501 where it remains for one clock cycle. From the start message state 501, the state machine logic cycles next to the INT-1 interrupt state 501, and concludes after a predetermined number of interrupts associated with a particular interrupt protocol at INT-N state 510. The state machine logic then transitions back to the stop state 500 where it remains until the next assertion of an active $S_{in}$ signal.

There has thus been described a mechanism for implementing a serial interrupt bus wherein peripherals may signal any one of a predetermined number of possible interrupts associated with a given interrupt protocol. Although the present invention has been described in terms of various embodiments, it will be appreciated by those skilled in the art that various modifications and alterations might be made without departing from the spirit and scope of the present invention. The invention should, therefore, be measured in terms of the claims which follows.

What is claimed is:

1. A computer system comprising:

a central processing unit (CPU) for executing an interrupt service routine in response to an interrupt pending signal;

a first interrupt controller coupled to provide said interrupt pending signal to said CPU in response to any one of a plurality of potential interrupt request signals;

a serial interrupt controller coupled to said first interrupt controller, said serial interrupt controller generating an appropriate one of said plurality of potential interrupt request signals corresponding to a received serial interrupt request signal; and a first plurality of serial interrupt peripherals interconnected and in communication with said serial interrupt controller, wherein each one of said first plurality of serial interrupt peripherals may request one or more of said plurality of potential interrupt request signals to be generated by said serial interrupt controller, each of said first plurality of serial interrupt peripherals including protocol logic configured to serially propagate said serial interrupt request signal to said serial interrupt controller.

2. The computer system of claim 1 wherein said first plurality of serial interrupt peripherals each comprise a serial interrupt input and a serial interrupt output, wherein the plurality of serial interrupt peripherals are interconnected such that they form a serial interrupt peripheral chain with the serial interrupt output of one serial interrupt peripheral coupled to convey its output to the serial interrupt input of a subsequent serial interrupt peripheral.

3. The computer system of claim 1 wherein a first interrupt peripheral of said plurality of interrupt peripherals includes a serial interrupt input and a serial interrupt output and said protocol logic operates in said first interrupt peripheral according to the following state diagram:

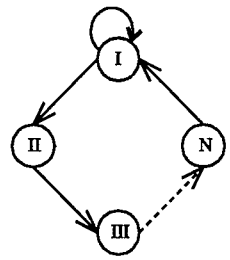

wherein said protocol logic remains in the state I stop state until said first interrupt peripheral receives an active signal at said serial interrupt input, in the state II start message state, said protocol logic propagates the active signal to said serial interrupt output, in states III-N, said protocol logic propagates signals received at said serial interrupt input to said serial interrupt output, said protocol logic asserting an active signal at said serial output when said protocol logic is in a state corresponding to a needed interrupt request.

4. The computer system of claim 1 wherein said serial interrupt controller and said plurality of serial interrupt peripherals are coupled to receive a common clock signal for timing said protocol logic.

5. The computer system of claim 2 wherein said serial interrupt controller further comprises a serial interrupt input and a serial interrupt output, wherein the serial interrupt output of said serial interrupt controller is coupled to convey its output to the serial interrupt input of a first serial interrupt peripheral in said serial interrupt chain, said serial interrupt input of said serial interrupt controller coupled to receive its input from the serial interrupt output of a last peripheral in said serial interrupt chain.

6. The computer system of claim 5 further comprising a serial interrupt bridge disposed in said serial interrupt chain for coupling a second plurality of serial interrupt peripherals within said serial interrupt chain.

7. The computer system of claim 5 wherein said plurality of serial interrupt peripherals and said serial interrupt controller each incorporate serial interrupt protocol logic for following a predetermined state diagram for propagating interrupt request signals through said serial interrupt chain.

8. The computer system of claim 6 further comprising a docking station, wherein said second plurality of serial interrupt peripherals comprise peripherals associated with said docking station.

9. The computer system of claim 8 wherein said serial interrupt bridge comprises:

a first serial interrupt input for receiving a serial interrupt request signal from said serial interrupt controller;

a first serial interrupt output for conveying said serial interrupt request signal to a first one of said second plurality of serial interrupt peripherals;

a second serial interrupt input for receiving said serial interrupt request signal from a last one of said second plurality of serial interrupt peripherals; and a second serial interrupt output for conveying said serial interrupt request signal to a first one of said first plurality of serial interrupt peripherals.

10. A peripheral for use in a computer system wherein said computer system includes a central processing unit (CPU), a first interrupt controller for notifying a said CPU of a pending interrupt in response to one of a plurality of potential interrupt request signals, and a serial interrupt controller for providing said interrupt request signals to said first interrupt controller in response to a received serial interrupt request signal, said peripheral comprising:

serial interrupt protocol logic for communicating with a serial interrupt bus;

a serial interrupt input coupled to said serial interrupt protocol logic, said serial interrupt input coupling said peripheral to said serial interrupt bus for receiving serial interrupt request signals; and a serial interrupt output coupled to said serial interrupt protocol logic, said serial interrupt output coupling said peripheral to said serial interrupt bus for conveying serial interrupt request signals over said serial interrupt bus, wherein said serial interrupt protocol logic controls said serial interrupt output such that a serial interrupt request signal corresponding to any one of said plurality of potential interrupt requests may be received at said serial interrupt input and propagated through said serial interrupt output.

11. The peripheral of claim 10 wherein said serial interrupt controller and said serial interrupt protocol logic each incorporate serial interrupt processing logic for following a predetermined state diagram for propagating interrupt request signals between said serial interrupt input and said serial interrupt output.

12. The peripheral of claim 10 further comprising a clock input for receiving a clocking signal for synchronizing the serial interrupt protocol logic to said serial interrupt controller.

13. The peripheral of claim 11 wherein said serial interrupt protocol logic operates according to the following state diagram:

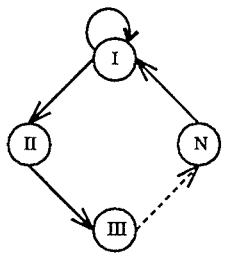

wherein the protocol logic remains in the state I stop state until the protocol logic receives an active signal at its serial interrupt input, in the state II start message state, said protocol logic propagates the active signal through its serial interrupt output, in states III-N, said protocol logic propagates signals received at its associated serial interrupt input through its associated serial interrupt output, said protocol logic asserting an active signal at the associated serial output when said protocol logic is in a state corresponding to a needed interrupt request.

14. The peripheral of claim 13 wherein one of states III to state N corresponds to a state for said peripheral to signal a system management interrupt to said CPU.

15. The peripheral of claim 13 wherein a plurality of state III to state N corresponds to IRQ interrupt signals in accordance with the ISA and EISA protocols.

16. A method for handling interrupts by a peripheral implemented on a serial interrupt bus comprising the steps of:

receiving a serial interrupt request signal on a serial interrupt input during a first clock period;

propagating said serial interrupt request signal through a serial interrupt output during a second clock period; and asserting an active signal on said serial interrupt output during a clock period corresponding to a desired interrupt state.

17. The method of claim 16 wherein said desired interrupt state is determined according to the following state diagram implemented by protocol logic associated with said peripheral:

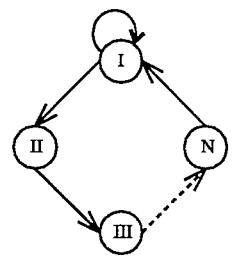

wherein the protocol logic remains in the state I stop state until the protocol logic receives an active signal at its serial interrupt input, in the state II start message state, said protocol logic propagates the active signal through its serial interrupt output, in states III-N, said protocol logic propagates signals received at its associated serial interrupt input through its associated serial interrupt output, said protocol logic asserting an active signal at the associated serial output when said protocol logic is in a state corresponding to a needed interrupt request.

18. The method of claim 17 wherein one of states III-state N corresponds to a state for said peripheral to signal a system management interrupt to said CPU.

19. The method of claim 18 wherein a plurality of state III to state N corresponds to IRQ interrupt signals in accordance with the ISA and EISA protocols.

* * * * *